Patented Mar. 22, 1932

1,850,205

UNITED STATES PATENT OFFICE

WILLIAM J. HALE, OF MIDLAND, MICHIGAN

PREPARATION OF ACYL HALIDES

No Drawing.    Application filed October 20, 1928.   Serial No. 313,950.

This invention relates to the preparation of organic acyl halides by the reaction of hydrogen halide upon a mixed anhydride in which one arm comprises an organic acyl radicle.

The preparation of acetyl chloride, for example, directly from acetic acid has been accomplished by various chlorinating agents, but the percentage yield in pure acetyl chloride has never been found satisfactory, owing to the difficulty in recovering the last traces of acetyl chloride from the effluent gaseous products, as well as to the tendency toward further chlorination of the organic products in the process.

It is now proposed to utilize a modification of the well-known reaction of anhydrous hydrogen halide upon an organic acid anhydride, which leads to a resolution of the latter into equimolecular quantities of the corresponding acid and acyl halide: and in particular so as to establish the procedure that a cyclic operation may be accomplished. When the production of such acyl halide is the object in view in cyclic operation, it will be required that the compound which is simultaneously liberated with the said halide and which contains the radicle of the other arm of the original anhydride, shall find re-entrance to the system, through a type of halogenation for the production of an active halide thereof which is then caused to react with a quantity of the acid whose halide is sought, for the purpose of producing another portion of the original anhydride which in turn is to suffer halohydrogenation.

The employment of a simple anhydride in this connection is in no wise necessary to the general reaction; the only prerequisite is that one of the organic radicles attached to the oxygen or anhydride tie of the anhydride molecule shall consist, for example, of the simple acetyl group when acetyl halide is the product sought. The other member of the anhydride molecule may consist of another carbon-containing radicle of acyl, alkyl or other type. In a complete cyclic operation may be employed, for example, any organic acid which is capable of direct conversion into its corresponding acid halide and which may be combined with another organic acid through elimination of HX (X denoting a halogen) to give a mixed organic anhydride; and such anhydride with the action of a hydrogen halide will be resolved into an organic acid and an organic acid halide, but such distribution of the elements of hydrogen halide acting must proceed through association of the positive group of HX or hydrogen atom, to that arm of the organic anhydride, which as a radicle possesses greater acidic or negative character, and the association of the negative group of HX, or halogen atom, to the arm of the anhydride, which as an organic radicle possesses less negative character. Of prime importance for the present invention is the use, for example, of the monochloroacetyl radicle in its association with the simple acetyl radicle to form the mixed anhydride,—monochloroacetic-acetic anhydride:

$$CH_2Cl.CO.O.CO.CH_3$$

Though the evidence accepted by Autenrieth and Thomas (Ber. 57,423 (1924)) indicates that many mixed organic anhydrides are to be looked upon as mixtures of the simple respective anhydrides, there remains indisputable evidence of the chemical individuality of formic-acetic anhydride, monochloracetic-acetic anhydride and many others involving the lower membered carbon radicles and certain of their derivatives. All doubt on the existence of mixed anhydrides is now dispelled by Van der Haar (Rec. Trav. Chim. 1929, 48, page 607; see Chem. Abs., 1929, 4478), in which mixed anhydrides are formed by the action of acetic anhydride upon the acids. The only exception appearing to arise when these free acids contain aldehydic or ketonic groups. Furthermore, the Consortium Fuer Elektrochemie has just patented a process for the preparation of mixed anhydrides through the agency of vinyl acetate (Br. Patent 288,549, see Chem. Abs. 1929, p. 608; Fr. Patent 562,078, see Chem. Abs. 1929, page 3479).

However, in the practice of this invention, the possibility of the momentary existence of any mixed anhydride makes such immediately applicable with the halohydrogenation stage hereinafter defined.

When hydrogen halide reacts upon a mixed anhydride such as monohalacetic-acetic anhydride, the latter is resolved into monohaloacetic acid and acetyl halide, the escape of the latter as vapor driving the equilibrium entirely toward the right.

(1) $XCH_2.CO.O.CO.CH_3 + HX \rightarrow$
$XCH_2COOH + CH_3.CO.X$ (Brueckner, Zeit. Angewandte Chemie 41. A 226 (1928); and Orton, Watson and Hughes, J. Chem. Soc. 130, 2458 (1927)).

Now when chloroacetic acid (b. p. 189° C.), for example, is brought into reaction with chlorine in the presence of sulphur chloride and at as low a temperature as 60° C. approximately, there is produced an almost quantitative yield of chloroacetyl chloride. When one mole of chloroacetyl chloride (b. p. 105° C.) is brought into reaction with one mole of glacial acetic acid (b. p. 118° C.) there is produced a mole of the mixed anhydride,—monochloracetic-acetic anhydride (b. p. 170° C.).

(2) $2Cl.CH_2CO.OH + SCl_2 + Cl_2 =$
$2Cl.CH_2.CO.Cl + 2HCl + SO_2$ (3) $Cl.CH_2.CO.Cl + HO.CO.CH_3 =$
$ClCH_2CO.O.COCH_3 + HCl$ (4) $ClCH_2CO.O.CO.CH_3 + HCl =$
$ClCH_2.COOH + CH_3COCl$

For a cyclic operation, these reactions may be considered as occurring in two chambers which will be denominated (1) the chlorination chamber in which Equation (2) is proceeding, and (2) the anhydrization and halohydrogenation chamber in which Equations (3) and (4) are proceeding.

Together with the production of this mixed anhydride (Equation 3), we note further that one mole of hydrogen chloride is likewise produced so that immediately there is inaugurated (Equation 4) the condition of equilibrium as described above and the hydrogen chloride actually operates to promote the formation of the highly volatile acetyl chloride and the creation of a residual mass of chloroacetic acid. This latter in turn need only be again chlorinated to yield chloroacetyl chloride in readiness for interaction with a fresh portion of acetic acid, and the cycle is complete.

The reaction (Equation 3) between chloroacetyl chloride and glacial acetic acid may be made to give as much as a 80 to 85% yield of isolatable mixed anhydride, here the monochloracetic-acetic anhydride; but to obtain such a high yield of isolatable anhydride, the greatest care must be exercised to remove the hydrogen chloride as it forms, to prevent the intermingling of the nascent hydrogen chloride with the reaction components. Where the production of acetyl chloride as such is desired, however, the desirable procedure dictates that these reaction components shall be held at boiling temperature of the acetyl halide, i. e. around 51° C. and not over 100° C., and under vigorous agitation. A further introduction from without of hydrogen chloride into the reaction mass will be found to facilitate the reaction of halohydrogenation of the mixed anhydride.

The vapors issuing from the reaction vessel will consist, of course, of acetyl chloride and some little hydrogen chloride, the former of which is constantly removed in its passage through a condenser. There will remain, however, a measurable quantity of acetyl chloride in the finally escaping hydrogen chloride. The retention and further use of this portion insures the success and the efficiency of the present process. The ease with which acetyl chloride is chlorinated by chlorine into chloroacetyl chloride offers at once the means of conserving the same, and to this end the vapors finally issuing from the condenser are made to pass directly into the chlorination chamber, in which the chloroacetic acid is in interaction with chlorine. Both the chloroacetic acid and the acetyl chloride are here converted into chloroacetyl chloride which is withdrawn to the reaction vessel for combination with acetic acid. The course of the chlorination of the acetyl chloride may be given:

(5) $CH_3.CO.Cl + Cl_2 \rightarrow Cl.CH_2CO.Cl + HCl$

The mixed (monochloracetic-acid) anhydride within the second reaction vessel, where monochloracetic-acetic acid is also under process of formation, operates upon the latter to produce a small portion of the anhydride of monochloroacetic acid (monochloracetyl oxide) which has a high boiling point and in turn will find its way back into the chlorination chamber along with the free chloroacetic acid. The action of hydrogen chloride which is being liberated in this chamber upon this anhydride, however, leads directly to monochloroacetyl chloride and monochloroacetic acid which latter undergoes a chlorination into monochloroacetyl chloride as set forth in Equation 2, and thus all of the products passing from reaction to chlorination chamber are again made useful in the form of chloroacetyl chloride for the next stage in the process.

(6) $(Cl.CH_2.CO)_2O + HCl =$
$Cl.CH_2.CO.Cl + Cl.CH_2.CO.OH$

The possible production of more highly chlorinated acetic acid products is not out of consideration. But whatever di- or tri-chloroacetyl chlorides may be produced in the chlorination chamber naturally will be presented for interaction with glacial acetic acid in the reaction vessel. Such mixed anhydrides,—unsymmetrical poly-chloroacetic anhydrides,—are of high boiling points and follow the same general reaction as described for monochloracetic-acetic anhydride and thus the residues as poly-chloroacetic acids will pass to the chlorination chamber and return in the cycle as poly-chlorinated acetyl chlorides.

Impurities in the acetic acid such as butyric acid and higher membered organic acids need not be considered as entering into the mixed anhydride formation as they do not modify the course of the reaction. Their conversion, therefore, into corresponding acid halides by action of hydrogen chloride is negligible under conditions given. In cases where their presence builds up too highly in the residual acid returning to the chlorination chamber, their removal from the monochloroacetic acid may be accomplished from time to time by resort to fractional distillation.

The invention as outlined presents an adaptation of well known reactions only recently clarified and now assembled for the direction of halogenating an organic acid indirectly into the corresponding acid halide. What has been outlined illustratively for the preparation of acetyl chloride through hydrochlorination of the mixed anhydride,—monochloracetic-acetic anhydride,—is equally applicable for the preparation of acetyl bromide through hydrobromination of the mixed anhydride,—monobromacetic - acetic anhydride. In carrying out this latter operation we need only to react acetic acid with bromine to obtain monobromoacetyl bromide, and then to cause this to react upon a mole of acetic acid whereupon the hydrogen bromide liberated will immediately react upon the mixed anhydride to yield acetyl bromide and monobromoacetic acid. This latter is next returned to the bromination chamber for conversion to bromoacetyl bromide and the cycle continued as before.

All known methods of converting acetic acid into an acetyl halide involve the use of free halogens or compounds of the same with non-metals, directly in contact with acetic acid or sodium acetate. This procedure leads to the formation of an appreciable quantity of haloacetyl halide, which remains as an impurity in the acetyl halide since it is not removed during the course of the operation. In distinction from this, the present invention eliminates all possible contact between the acetic acid and halogenating agents other than hydrogen halide which, as such, does not cause a side-reaction leading to the production of haloacetic acid from acetic acid. Any excessive halogenation occurs in a different step or phase, from which acetic acid is excluded, with the production of an intermediate acid halide which is of higher boiling point than acetyl halide. Further, the products of excessive halogenation and of any side reactions, and the escaping vapors from which the acetyl halide has been separated, all are employed during the cycle of the reactions which lead to the production of acetyl halide, so that the cyclic procedure is of high efficiency and is not interfered with by such side reactions.

*Example A*

Into a reaction flask provided with stirring device and reflux condenser with outlet through specially installed cooling vessels, 60 grams of glacial acetic acid and 113 grams of chloroacetyl chloride were introduced. Upon rapid agitation, a copious evolution of acetyl chloride proceeded, and upon gentle warming to the boiling point of acetyl chloride, and at no time in excess of 100° C. and preferably below 60° C., all the acetyl chloride was driven off and collected by fractional condensation. 70 grams of distillate collected in the receivers, consisting only of pure acetyl chloride and calculated to 89% yield.

The uncondensed vapors, consisting of acetyl chloride together with hydrogen chloride, were led into the chlorination chamber, into which also was transferred the residual mass from the reaction flask consisting chiefly of monochloroacetic acid. Upon treatment of the mixture of acetyl chloride and monochloroacetic acid with chlorine and sulphur chloride, its entire conversion into chloroacetyl chloride was easily accomplished, here amounting to about 119 grams, and this in turn was transferred to the reaction flask to be mixed with the corresponding equimolecular quantity of glacial acetic acid.

Upon following this cyclic method of procedure so that all of the escaping vapors containing acetyl chloride are returned to the system, the quantity of acetyl chloride, obtained from a quantity of acetic acid introduced, calculated to almost quantitative yield. For speeding up the process, a slow stream of hydrogen chloride led into the original reaction mixture of chloroacetyl chloride and glacial acetic acid has been found of particular efficiency.

Although the given example describes the employment of chlorine derivatives and chlorination, the reaction is also possible with other halogens. For example, the employment of bromo derivatives is highly effective, and in particular the bromoacetic anhydride may be formed at room temperature from the bromoacetyl bromide and acetic acid.

Certain of the features set forth in the present specification are likewise presented in my copending application Serial No. 313,951, filed Oct. 20, 1928, in which is claimed the employment of such reactions in the preparations of acid anhydrides.

What I claim as new and desire to secure by Letters Patent is:

1. A cyclic method of preparing an acetyl halide which comprises mixing acetic acid with a haloacetyl halide while maintaining hydrogen halide present, condensing acetyl halide from the escaping vapors, and thereafter treating the residual liquid together with the uncondensed portion of said vapors with a halogenating agent, whereby to produce a further quantity of haloacetyl halide for use in the cycle.

2. A cyclic method of preparing an acetyl halide by agency of a haloacetyl halide, which comprises mixing the haloacetyl halide with an equimolecular portion of acetic acid whereby to give hydrogen halide and a mixed acid anhydride which is directly and simultaneously subjected to halohydrogenation by said hydrogen halide to a state of equilibrium with haloacetic acid and acetyl halide, maintaining the mixture at a temperature just higher than the boiling point of the acetyl halide for completely removing the latter, and treating the liquid residue which consists primarily of haloacetic acid with a halogenating agent to reconvert it into haloacetyl halide for further employment in the cycle.

3. A cyclic method of preparing acetyl chloride by agency of chloroacetyl chloride, which comprises mixing the chloroacetyl chloride with an equimolecular portion of acetic acid whereby to give hydrogen chloride and monochloroacetic-acetic anhydride which is directly and simultaneously subjected to chlorohydrogenation by said hydrogen chloride to a state of equilibrium with chloroacetic acid and acetyl chloride, maintaining the mixture at a temperature just higher than the boiling point of the acetyl chloride for completely removing the latter, and treating the liquid residue which consists primarily of chloroacetic acid with a chlorinating agent to reconvert it into chloroacetyl chloride for further employment in the cycle.

4. A cyclic method of preparing an acetyl bromide by agency of a bromoacetyl bromide, which comprises mixing the bromoacetyl bromide with an equimolecular portion of acetic acid whereby to give hydrogen bromide and monobromoacetic-acetic anhydride which is directly and simultaneously subjected to bromohydrogenation by said hydrogen bromide to a state of equilibrium with bromoacetic acid and acetyl bromide, maintaining the mixture at a temperature just higher than the boiling point of the acetyl bromide for completely removing the latter, and treating the liquid residue which consists primarily of bromoacetic acid with a brominating agent to reconvert it into bromoacetyl bromide for further employment in the cycle.

5. A cyclic method of preparing acetyl chloride by agency of chloroacetyl chloride, which comprises mixing and agitating the chloroacetyl chloride with an equimolecular portion of acetic acid whereby to give hydrogen chloride and monochloroacetic-acetic anhydride which is directly and simultaneously subjected to chlorohydrogenation by said hydrogen chloride to a state of equilibrium with chloroacetic acid and acetyl chloride, passing hydrogen chloride into the mixture, bringing the mixture to a temperature just higher than the boiling point of the acetyl chloride for completely removing the latter by evaporation, condensing acetyl chloride from the escaping vapors, treating the liquid residue which consists primarily of chloroacetic acid with a chlorinating agent having the properties of sulfur dichloride at a temperature of about 60° C. to reconvert it into chloroacetyl chloride for further employment in the cycle, and returning the uncondensed vapors from which acetyl chloride has been separated back into the system.

In testimony whereof, I affix my signature.

WILLIAM J. HALE.

CERTIFICATE OF CORRECTION.

Patent No. 1,850,205.  March 22, 1932.

WILLIAM J. HALE.

It is hereby certified that error appears in the printed specification of the above numbered patent requiring correction as follows: Page 2, line 101, for the compound word "monochloracetic-acid" read monochloracetic-acetic, and line 103, for the compound word "monochloracetic-acetic" read monochloracetic; and that the said Letters Patent should be read with these corrections therein that the same may conform to the record of the case in the Patent Office.

Signed and sealed this 12th day of July, A. D. 1932.

(Seal)

M. J. Moore,
Acting Commissioner of Patents.